United States Patent [19]

Hubbard et al.

[11] Patent Number: 4,654,507
[45] Date of Patent: Mar. 31, 1987

[54] SOLDER REFLOW HEATER BAR ASSEMBLY

[75] Inventors: Robert F. Hubbard, Buena Park; Joseph M. Jacobs, Redondo Beach, both of Calif.

[73] Assignee: Hughes Aircraft Company, Los Angeles, Calif.

[21] Appl. No.: 732,016

[22] Filed: May 7, 1985

[51] Int. Cl.⁴ .................................................. B23K 3/04
[52] U.S. Cl. ..................................... 219/233; 219/241; 219/494; 219/85 D
[58] Field of Search .............. 219/233, 241, 494, 85 D; 228/8, 9

[56] References Cited

U.S. PATENT DOCUMENTS 3,991,297 11/1976 Ammann .............................. 219/233
3,995,135 11/1976 Osipov et al. ...................... 219/85 D
4,192,992 3/1980 Stevens et al. ...................... 219/494
4,237,369 12/1980 Jones .................................. 219/494 X
4,320,285 3/1982 Koether ............................ 219/494 X Primary Examiner—Kenneth J. Ramsey
Attorney, Agent, or Firm—Leonard A. Alkov; A. W. Karambelas

[57] ABSTRACT

Heater bar assembly for a reflow solder machine comprises first and second fingers (50, 52) carrying U-shaped heater bar (54) which is pivotable on main member 22. A spring urges the heater bar assembly to the centered position. First and second thermocouples (82, 84) are secured to the heater bar (54) and are connected through a transfer switch (104) by which their electrical connections can be alternated. One controls the power supply and the other cuts off the power supply if temperature exceeds the selected temperature.

17 Claims, 4 Drawing Figures

SOLDER REFLOW HEATER BAR ASSEMBLY

BACKGROUND

This invention is directed to an easily interchangeable assembly which carries a solder reflow heater bar so that the heater bar can pivot with respect to the work to apply an even force over several leads being soldered, and is also directed to an associated control system wherein two thermocouples on the heater bar respectively sense the heater bar temperature to control input power and to sense over-temperature to stop the heating cycle when over-temperatures are sensed.

In reflow soldering, a printed circuit board carries pads thereon which are tinned with solder. A component, often with many parallel leads, is put in place with its leads over the pads. A heater bar is brought down into contact and heat is applied. Lack of compliance of the heater bar causes uneven force upon the leads to result in unreliable soldering. Free pivoting of the heater bar does not control the initial angle of the heater bar and this results in lateral motion of the heater bar as it moves down into soldering position. Such lateral motion may swing the leads off of their pads, may cause the leads to contact adjacent pads, or may cause limited lead-path contact with consequent unreliability.

A thermocouple is mounted on the heater bar to sense the heater bar temperature and transmit this sensed data to the power supply. It can be readily determined that the thermocouple has failed by becoming an open circuit, and such detection can control the power supply circuitry to disable the power output when the thermocouple circuit is open. However, present power supply circuitry cannot detect partial or total short circuits in the thermocouple circuit. If this mode of failure occurs in which the thermocouple resistance has deteriorated to a value between nominal resistance and short circuit, with circuit resistance less than nominal, there is a corresponding lower signal amplitude which results in excessive heating, which often causes damage to the printed circuit board and heater bar.

Heater bars are subject to degradation and destruction and occasionally must be changed. Thus, it is also necessary to provide a heater bar assembly which permits quick and easy changing to minimize production down time. Accordingly, there is need for a solder reflow heater bar assembly and control system which is easily changed, which is properly compliant with the level of the leads to be soldered, and is arranged so that thermocouple failure can be sensed before excessive heating of the board takes place.

SUMMARY

In order to aid in the understanding of this invention, it can be stated in essentially summary form that it is directed to a solder reflow heater bar assembly and control system wherein the heater bar subassembly is readily demountable and is pivoted and biased toward a central position. The heater bar carries two thermocouples which are connected to alternately control the power supply and sense excessive temperatures.

It is, thus, a purpose and advantage of this invention to provide a solder reflow heater bar assembly which greatly improves the reliability and quality of reflow soldering with extended longevity of the heater bar assembly.

It is a further purpose and advantage of this invention to provide two thermocouples on the heater bar, with the thermocouples connected to prevent catastrophic thermal damage to the printed circuit boards being soldered, in the event of failure of one of the thermocouples.

It is a further purpose and advantage of this invention to greatly reduce the time required to replace the failed portion of the assembly in order to resume production.

It is another purpose and advantage of this invention to reduce the amount of lateral force and reduce the distance of lateral motion of the heater bar with respect to the component leads as the heater bar is brought down to greatly reduce component skewing in the soldering process so as to yield fewer defects in part orientation and solder disturbance.

Other purposes and advantages of this invention will become apparent from a study of the following portion of the specification, the claims and the attached drawings.

DESCRIPTION OF THE PREFERRED EMBODIMENT

Figure 1:
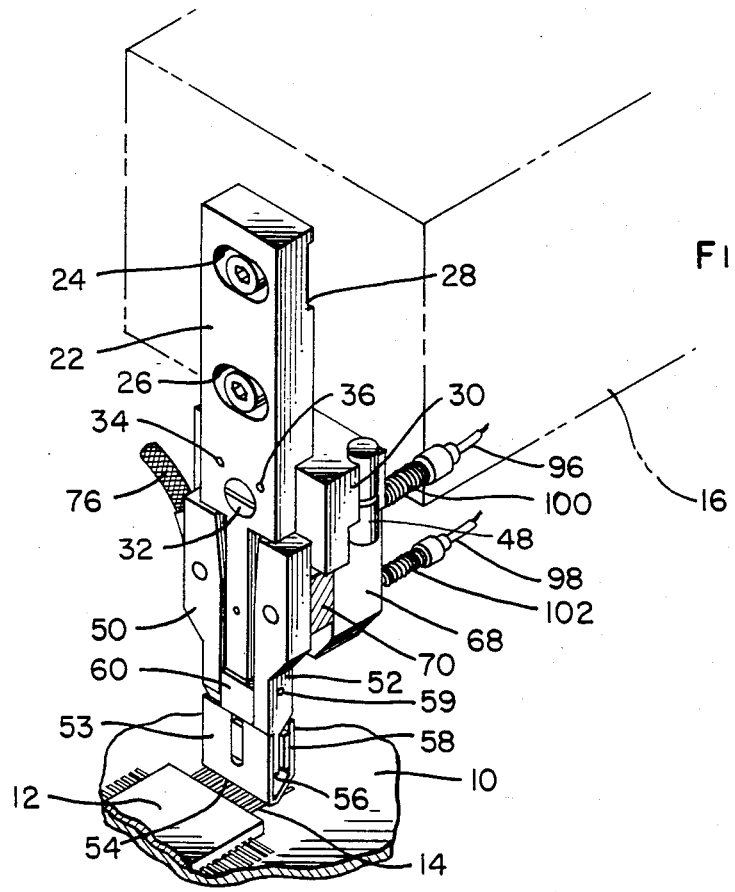
FIG. 1 is an isometric view of the solder reflow heater bar of this invention associated with parts to be soldered and schematically showing the reflow solder machine in dashed lines.

Printed circuit board 10 is illustrated in FIG. 1. Mounted thereon is semiconductor device 12 which has a plurality of leads 14 extending from at least one side thereof. The purpose of reflow soldering machine 16 is to solder the leads onto pretinned pads on the printed circuit board. Reflow soldering machine 16 includes a ram, which is moved downwardly to bring the reflow solder heater bar assembly down to the leads 14, power supply 18 and power supply control system 20, see FIG. 4. Machine 16 has a ram which moves toward the printed circuit board when soldering is desired. To this ram is secured main member 22 by means of upper and lower machine screws which pass through slotted openings 24 and 26. The purpose of the slotted openings is to permit the alignment of the main member in a direction perpendicular to the printed circuit board 10 and parallel to the direction of motion of the main ram. Keyway 28 engages on a cooperating key on the ram so that even though there is lateral adjustability, the main member 22 exactly follows the motion of the ram.

Spring block 30 is fastened on the rear (as seen in FIG. 1) of main member 22. Spring block 30 is notched to engage around the sides of member 22 and is secured in place by means of screw 32 and a pair of pins 34 and 36. Spring block 30 has hole 38 therethrough, see FIG. 2, and in the spring hole 38 lies tension spring 40. There is an upright, half cylindrical yoke in each end of spring block 30. Yoke 42 is shown at the left end of the block in FIG. 2, while yoke 44 is shown at the right of the block. These yokes extend past spring hole 38. Pins 46 and 48 respectively lie in these yokes. A loop on each end of tension spring 40 engages around one of the pins to resiliently urge the pins into the yoke recesses.

Figure 3:
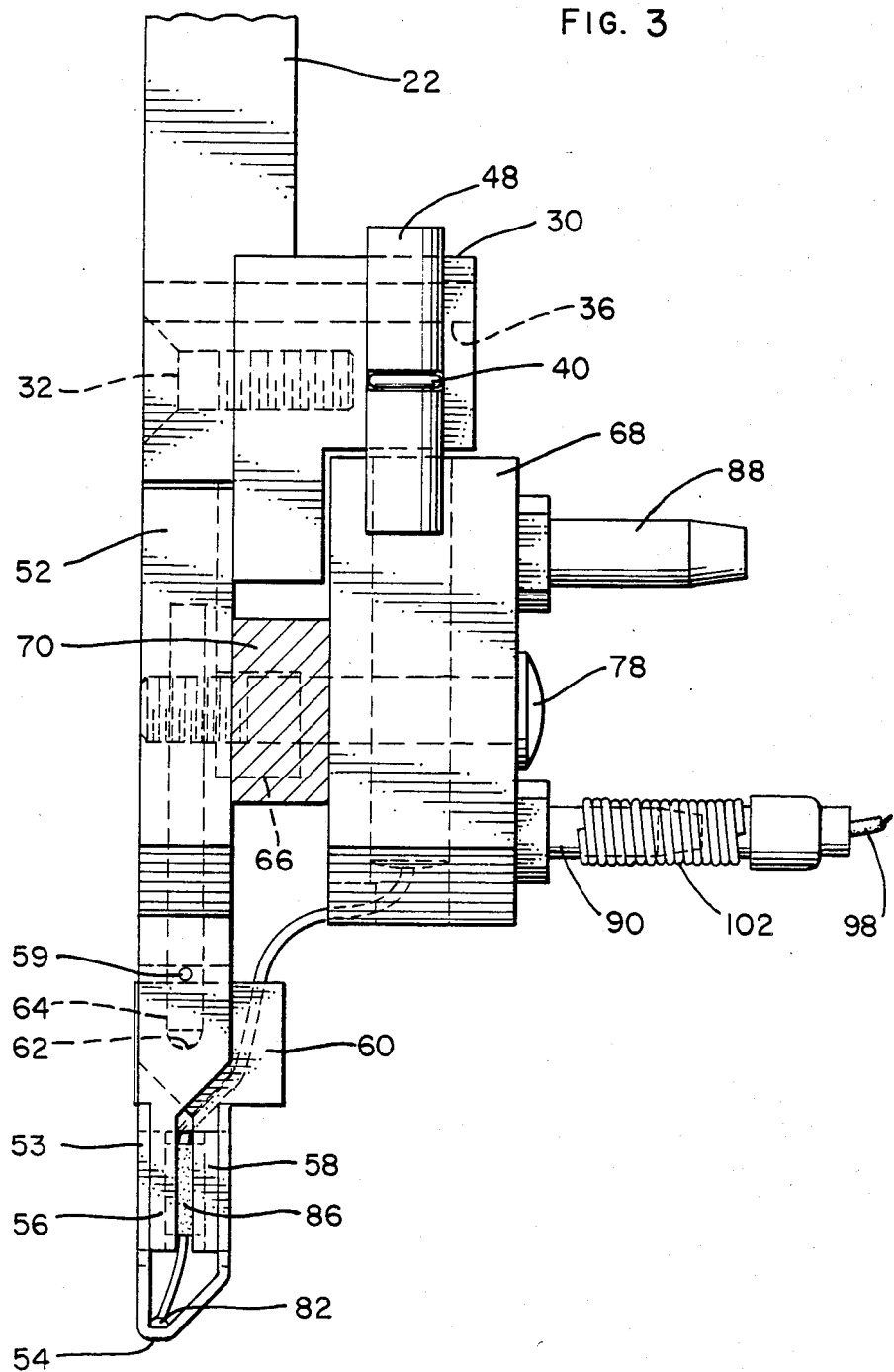
FIG. 3 is a right side elevational view thereof.

Fingers 50 and 52 double as supports and conductors for the wide, U-shaped heater bar 54 which is secured to both of them. The heater bar is thin at its tip 54 so that most of the resistance heating occurs at tip 54. The fingers lie next to each other over a substantial part of their length, but as is seen in FIG. 3, finger 52 thins to a blade 56 which supports the front of the heater bar, while finger 50 thins to a blade 58 which supports the back of the heater bar. The fingers are of electrically conductive material such as a copper alloy, while the heater bar is a U-shaped sheet metal structure made of a metal which has a higher electrical resistance and greater resistance to solder wetting, tinning or other degradation in this service. Inconel is suitable. The U-shaped heater bar is brazed to the blades for security.

Figure 2:
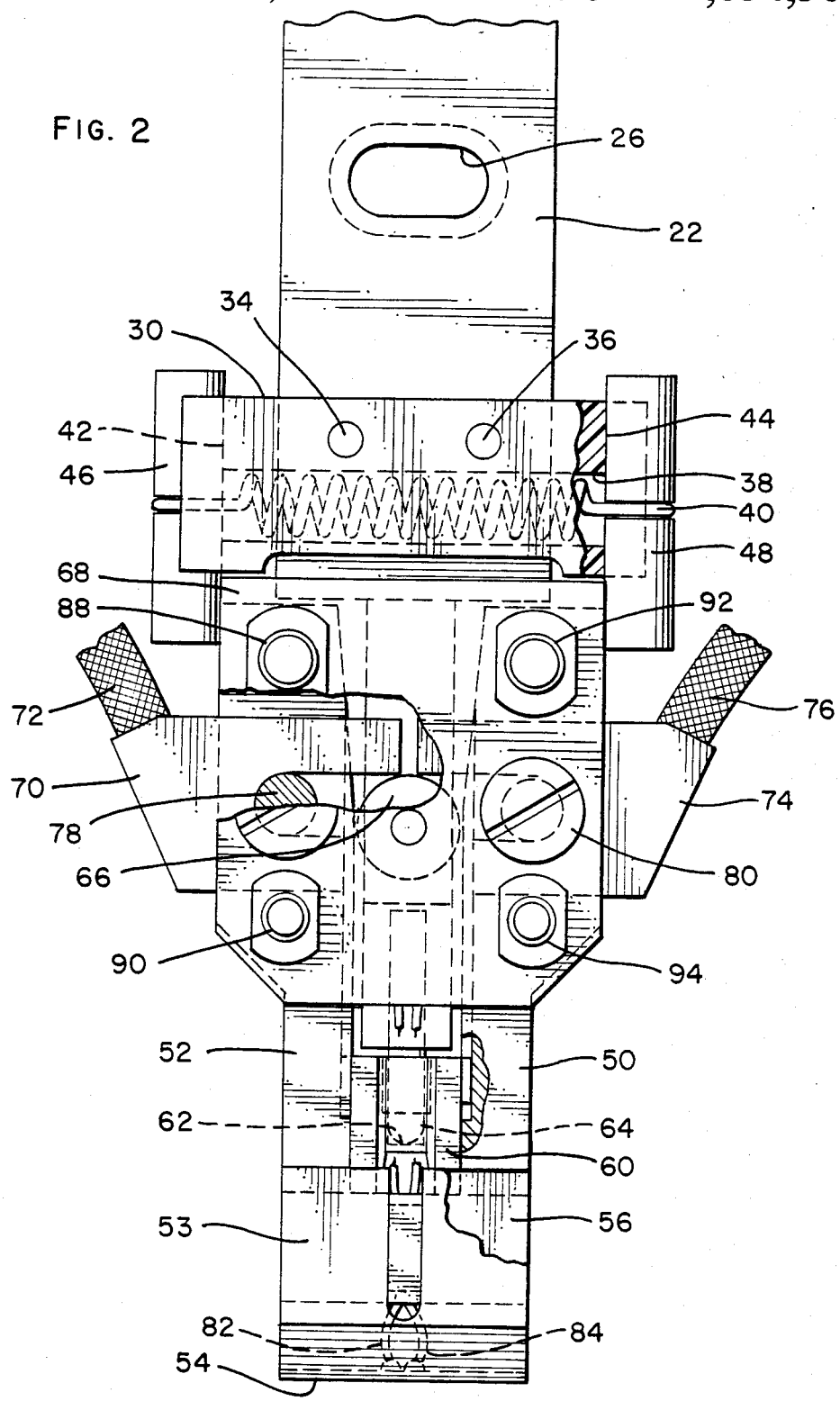
FIG. 2 is an enlarged front elevational view of the solder reflow heater bar assembly, with parts broken away.

Pivot block 60, see FIGS. 2 and 3, is positioned between fingers 50 and 52. Pivot block 60 has a key on each side thereof, one of which fits into a keyway in each of the fingers. Downward motion of pivot block 60 is limited by the two blades 56 and 58. Upward movement is limited by left and right pins through fingers 50 and 52. The right one is indicated at 59 in FIGS. 1 and 3. Pivot block 60 is made of insulator material and has therein pivot recess 62 into which extends pivot pin 64 which is mounted on the bottom of main member 22. In this way, the lugs, the fingers, the pivot block and the heater bar comprise the heater subassembly that can rotate around the nose of pivot pin 64. Sufficient clearance is provided in pivot recess 62 and between the fingers 50 and 52 to permit relative motion. Insulator disc 66 is mounted on the lower end of main member 22 to prevent either of the fingers from rocking into contact with the main member to provide electrical isolation and to restrain the heater subassembly from moving downward.

Saddle block 68 is made of insulator material and spans the width of the fingers. Lug 70 is on the end of lead 72, while lug 74 is on the end of lead 76. These lugs have slots in the end thereof with the upper legs of the lugs above the slot extending toward each other above disc 66 but not touching each other. When in place, as shown in FIG. 2, they hold the heater subassembly up. Screws 78 and 80 pass through openings in the saddle block, through the slotted openings in the lugs and into threaded openings in the respective fingers. In this way, the saddle block is secured in place and the leads are securely connected to the fingers.

In addition to the electrical leads, there are two thermocouple sensors 82 and 84 brazed to the inside of the U-shaped heater bar. The leads from the sensors pass through ceramic tube 86 which is mounted in V-grooves in the facing sides of blades 56 and 58. The four leads from the two thermocouples terminate in connector pins 88, 90, 92 and 94 which extend outward from saddle block 68. These connector pins serve as quick disconnects for the thermocouple leads to the circuitry of control system 20. Leads 96 and 98 carry springs 100 and 102 which resiliently wrap around the connector pins. Connection and disconnection can be readily made by turning the spring with respect to the pin in the spring unwinding direction.

This connection makes it easy to replace the detachable heater subassembly. The thermocouple leads can be quickly removed. Thereupon, the screws 78 and 80 are loosened to permit the removal of the power supply leads. The heater subassembly can now be lowered off of pivot pin 64 and removed. Reattachment of a new heater bar assembly is similarly convenient.

Figure 4:
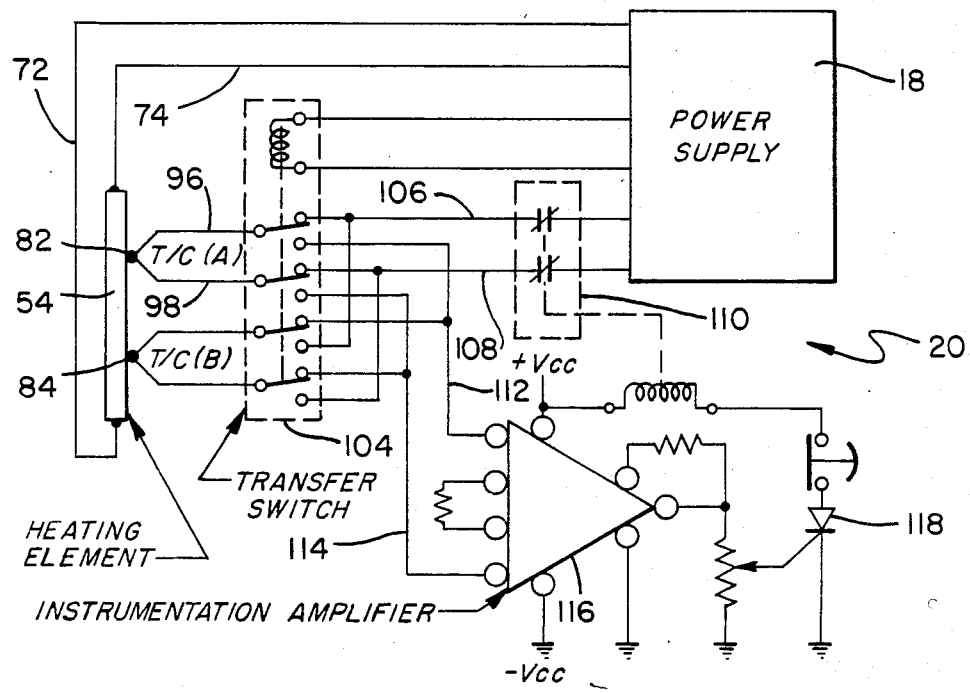
FIG. 4 is a schematic diagram of the circuitry of the control system.

Power supply 18 is part of the reflow solder machine 16. It conventionally has therein a sensor which indicates when the temperature-sensing thermocouple is an open circuit. The control system 20 includes the power supply 18 and its built-in open thermocouple sensor. As is seen in FIG. 4, the thermocuples 82 and 84 are connected through transfer switch 104. With the transfer switch in the position indicated, leads 96 and 98 of thermocouple 82 are connected by leads 106 and 108 to the open circuit sensor as well as to the temperature control circuitry in the power supply. Thus, thermocouple 82 is connected to control the power supply to limit the temperature reached by the heater bar tip 54. Relay 110 has normally closed contacts in the leads 106 and 108.

Thermocouple 84 is connected to lines 112 and 114, and they are connected to the inputs of amplifier 116. The output of amplifier 116 is connected to SCR 118 which controls relay 110. Amplifier 116 is set so that a slightly higher temperature at thermocouple 84 causes actuation which opens relay 110 to signal an open circuit to the power supply to shut down the power. Amplifier 116 is an Analog Devices thermocouple amplifier. In this way, when the desired temperature at the heating element is exceeded, the power supply is shut off, even when thermocouple 82 does not sense and signal the excessive temperature.

In order to prevent a situation where thermocouple 84 has an open circuit and thus is unable to protect against low resistance in thermocouple 82, transfer switch 104 interchanges the functions of thermocouples 82 and 84 with each cycle of the power supply. The power supply is equipped with circuitry which energizes the transfer switch 104 on alternate cycles. In this way, if either thermocouple is open or decreases circuit resistance, it is detected during that cycle or the next cycle.

In this way, a solder reflow heater bar subassembly is easily interchangeable and is properly compliant to the level of the leads on the board. In addition, the control associated therewith permits prompt detection of thermocouple failure and promptly signals such failure.

This invention has been described in its presently contemplated best mode, and it is clear that it is susceptible to numerous modifications, modes and embodiments within the ability of those skilled in the art and without the exercise of the inventive faculty. Accordingly, the scope of this invention is defined by the scope of the following claims.

What is claimed is:

1. A heater bar assembly comprising:
a main member, a pivot on said main member;
first and second electrically conductive fingers, a heater bar interconnecting said fingers, means on at least one of said fingers for pivotally mounting said fingers on said main member; and
resilient means interconnecting said fingers and said main member for resiliently urging said fingers with respect to said main member to a centered position.

2. The heater bar assembly of claim 1 wherein an insulator block is mounted on both of said fingers and said pivot means is on said insulator block.

3. The heater bar assembly of claim 2 wherein said pivot means between said main member and said fingers comprises a pivot pin in a pivot recess.

4. The heater bar assembly of claim 3 wherein said recess is in said insulator block and said pivot pin is the convex end of a pin forming a portion of said main member.

5. The heater bar assembly of claim 4 wherein said resilient means comprises a tension spring.

6. The heater bar assembly of claim 5 wherein there is a saddle block connected to both said fingers and insulated with respect to said fingers and there are first and second pins engaged by said tension spring, said saddle block being positioned between said pins.

7. The heater bar assembly of claim 6 wherein there is a spring block mounted on said main member, said spring block having first and second ends and having first and second yokes respectively formed in said first and second ends, said pins lying within said yokes so that displacement of one of said pins from its yoke causes stretching of said tension spring.

8. The heater bar assembly of claim 7 wherein said saddle block is of insulated material and is secured to said first and second fingers by first and second bolts, respectively, said bolts detachably attaching first and second power leads to said first and second fingers.

9. The heater bar assembly of claim 1 wherein said resilient means comprises a tension spring.

10. The heater bar assembly of claim 9 wherein there is a saddle block connected to both said fingers and insulated with respect to said fingers and there are first and second pins engaged by said tension spring, said saddle block being positioned between said pins.

11. The heater bar assembly of claim 10 wherein there is a spring block mounted on said main member, said spring block having first and second ends and having first and second yokes respectively formed in said first and second ends, said pins lying within said yokes so that displacement of one of said pins from its yoke causes stretching of said tension spring.

12. The heater bar assembly of claim 11 wherein said saddle block is of insulated material and is secured to said first and second fingers by first and second bolts, respectively, said bolts detachably attaching first and second power leads to said first and second fingers.

13. The heater bar assembly of claim 12 wherein there are first and second thermocouples secured to said heater bar, terminals for said thermocouples on said saddle block, said thermocouples being electrically connected to said thermocouple terminals.

14. A heater bar assembly comprising:
a main member movable toward and away from the work piece upon which a soldering step is to be performed;
first and second fingers and a heater bar electrically interconnecting said first and second fingers, said first and second fingers being pivotally mounted with respect to said main member;
means resiliently interconnecting said fingers and said main member to resiliently urge said fingers and said heater bar carried thereon to a centered position with respect to said main member;
first and second thermocouples secured to said heater bar, said first thermocouple being connectable to a power supply to control the amount of electric power delivered to said heater bar to control the temperature of said heater bar to a desired temperature level, said second thermocouple being connected to the power supply to stop the power supply when said second thermocouple detects temperature above the desired temperature.

15. The heater bar assembly of claim 14 further including a transfer switch electrically connected to said first and second thermocouples for electrically exchanging said first and second thermocouples.

16. The heater bar assembly of claim 15 further including means for controlling said transfer switch so that it electrically interchanges said first and second thermocouples substantially on each actuation of said power supply.

17. A heater bar assembly comprising:
first and second fingers for electrical connection to a heater power supply, a heater bar mounted on said first and second fingers to be heated by current supplied to said fingers;
first and second thermocouples mounted on said heater bar, said first thermocouple being connectable to the power supply to control the power supply to supply power until said heater bar reaches a selected temperature, said second thermocouple being connected to the power supply to turn off the power supply when said second thermocouple senses a temperature higher than the selected temperature;
a transfer switch connected to both said first and second thermocouples to be actuated periodically by actuation of said power supply for transferring the connections of said first and second thermocouples so that said second thermocouple controls the power supply to deliver current until a selected temperature is reached and said first thermocouple turns off the power supply when the selected temperature is exceeded.

* * * * *